(12) United States Patent
Ide et al.

(10) Patent No.: US 11,440,074 B2
(45) Date of Patent: Sep. 13, 2022

(54) FORMING DEVICE, FORMING METHOD, AND METAL PIPE

(71) Applicant: SUMITOMO HEAVY INDUSTRIES, LTD., Tokyo (JP)

(72) Inventors: Akihiro Ide, Ehime (JP); Masayuki Ishizuka, Ehime (JP); Norieda Ueno, Tokyo (JP); Kimihiro Nogiwa, Ehime (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 17/015,898

(22) Filed: Sep. 9, 2020

(65) Prior Publication Data
US 2020/0406330 A1 Dec. 31, 2020

Related U.S. Application Data

(63) Continuation of application No. PCT/JP2019/004280, filed on Feb. 6, 2019.

(30) Foreign Application Priority Data

Mar. 9, 2018 (JP) .............................. JP2018-043312

(51) Int. Cl.
| B21D 26/00 | (2006.01) |
| B21D 26/033 | (2011.01) |
| F16L 9/00 | (2006.01) |
| F16L 9/02 | (2006.01) |
| B21D 26/047 | (2011.01) |

(52) U.S. Cl.
CPC ......... *B21D 26/033* (2013.01); *B21D 26/047* (2013.01); *F16L 9/006* (2013.01); *F16L 9/02* (2013.01)

(58) Field of Classification Search
CPC .. B21D 26/033; B21D 26/047; B21D 22/025; B21D 37/16; B21D 19/08; B21D 24/16
See application file for complete search history.

(56) References Cited

U.S. PATENT DOCUMENTS

| 8,297,096 B2 | 10/2012 | Mizumura et al. |
| 2019/0119768 A1 | 4/2019 | Schleichert |

FOREIGN PATENT DOCUMENTS

| EP | 1 015 645 A1 | 7/2000 | |
| EP | 1 296 843 A2 | 4/2003 | |
| EP | 1296843 A2 * | 4/2003 | ............ B21D 53/88 |
| JP | 2005-262232 A | 9/2005 | |
| JP | 2006-061944 A | 3/2006 | |
| JP | 2006-104527 A | 4/2006 | |

(Continued)

OTHER PUBLICATIONS

International Search Report issued in Application No. PCT/JP2019/004280, dated May 14, 2019.

(Continued)

*Primary Examiner* — Debra M Sullivan
(74) *Attorney, Agent, or Firm* — Michael Best & Friedrich LLP

(57) ABSTRACT

A forming device which expands a metal pipe material to form a metal pipe having a pipe portion and a flange portion includes a hardness lowering portion which lowers a hardness of the flange portion to be lower than a hardness of the pipe portion.

8 Claims, 8 Drawing Sheets

(56) References Cited

FOREIGN PATENT DOCUMENTS

| JP | 2016-002577 A | 1/2016 |
| JP | 2016-190248 A | 11/2016 |
| WO | 01/96133 A2 | 12/2001 |
| WO | WO-2009/014233 A1 | 1/2009 |
| WO | WO-2016/088665 A1 | 6/2016 |
| WO | WO-2017/190220 A1 | 11/2017 |

OTHER PUBLICATIONS

Search Report issued in European Application No. 19764905.6, dated Mar. 10, 2021.
Office Action issued in Canadian Application No. 3,088,954, dated Mar. 28, 2022.

* cited by examiner

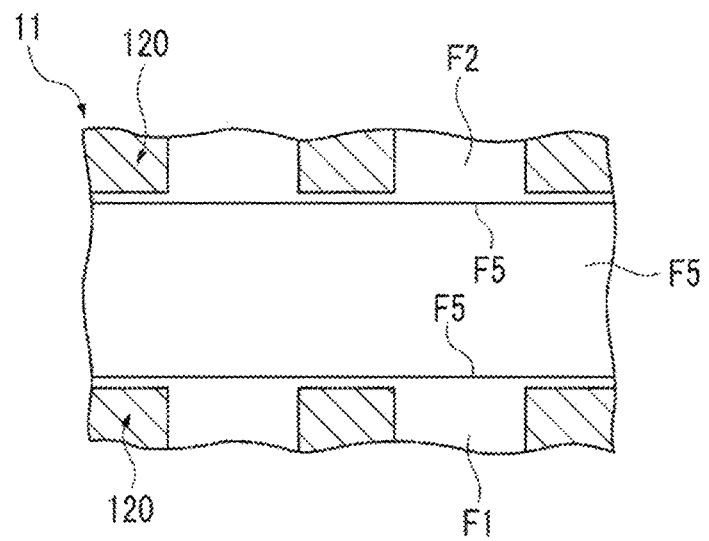
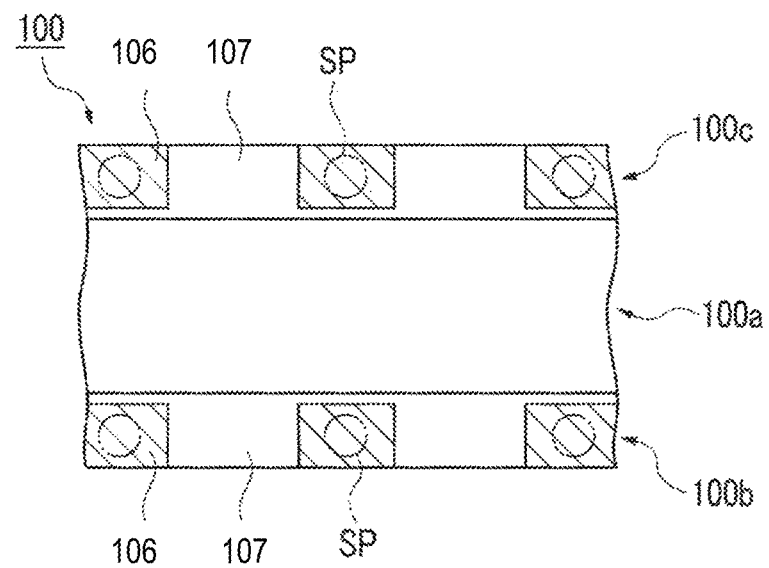

FORMING DEVICE, FORMING METHOD, AND METAL PIPE

RELATED APPLICATIONS

The contents of Japanese Patent Application No. 2018-043312, and of International Patent Application No. PCT/JP2019/004280, on the basis of each of which priority benefits are claimed in an accompanying application data sheet, are in their entirety incorporated herein by reference.

BACKGROUND

Technical Field

A certain embodiment of the present invention relates to a forming device, a forming method, and a metal pipe.

Description of Related Art

In the related art, there is known a forming device in which a metal pipe material is expanded and a metal pipe is formed by means of a forming die. For example, in the case of a forming device disclosed in the related art, it is possible to form a metal pipe having a pipe portion and a flange portion. In the forming device, a metal pipe is formed by disposing a metal pipe material that is electrically heated in the forming die and expanding the metal pipe material while forming a flange portion with the forming die closed.

SUMMARY

According to an embodiment of the present invention, there is provided a forming device which expands a metal pipe material to form a metal pipe having a pipe portion and a flange portion, the forming device including a hardness lowering portion which lowers a hardness of the flange portion to be lower than a hardness of the pipe portion.

According to another embodiment of the present invention, there is provided a forming method of expanding a metal pipe material to form a metal pipe having a pipe portion and a flange portion, the forming method including lowering a hardness of the flange portion to be lower than a hardness of the pipe portion.

According to still another embodiment of the present invention, there is provided a metal pipe including a pipe portion and a flange portion, in which a hardness of the flange portion is lower than a hardness of the pipe portion.

BRIEF DESCRIPTION OF THE DRAWINGS

FIG. 2A is a view showing a state where the electrode holds a metal pipe material, FIG. 2B is a view showing a state where a gas supply nozzle is pressed against the electrode, and FIG. 2C is a front view of the electrode.

FIG. 6A is a view of flange forming surfaces as seen from above and FIG. 6B is a view of a metal pipe as seen from above.

DETAILED DESCRIPTION

Figure 1:
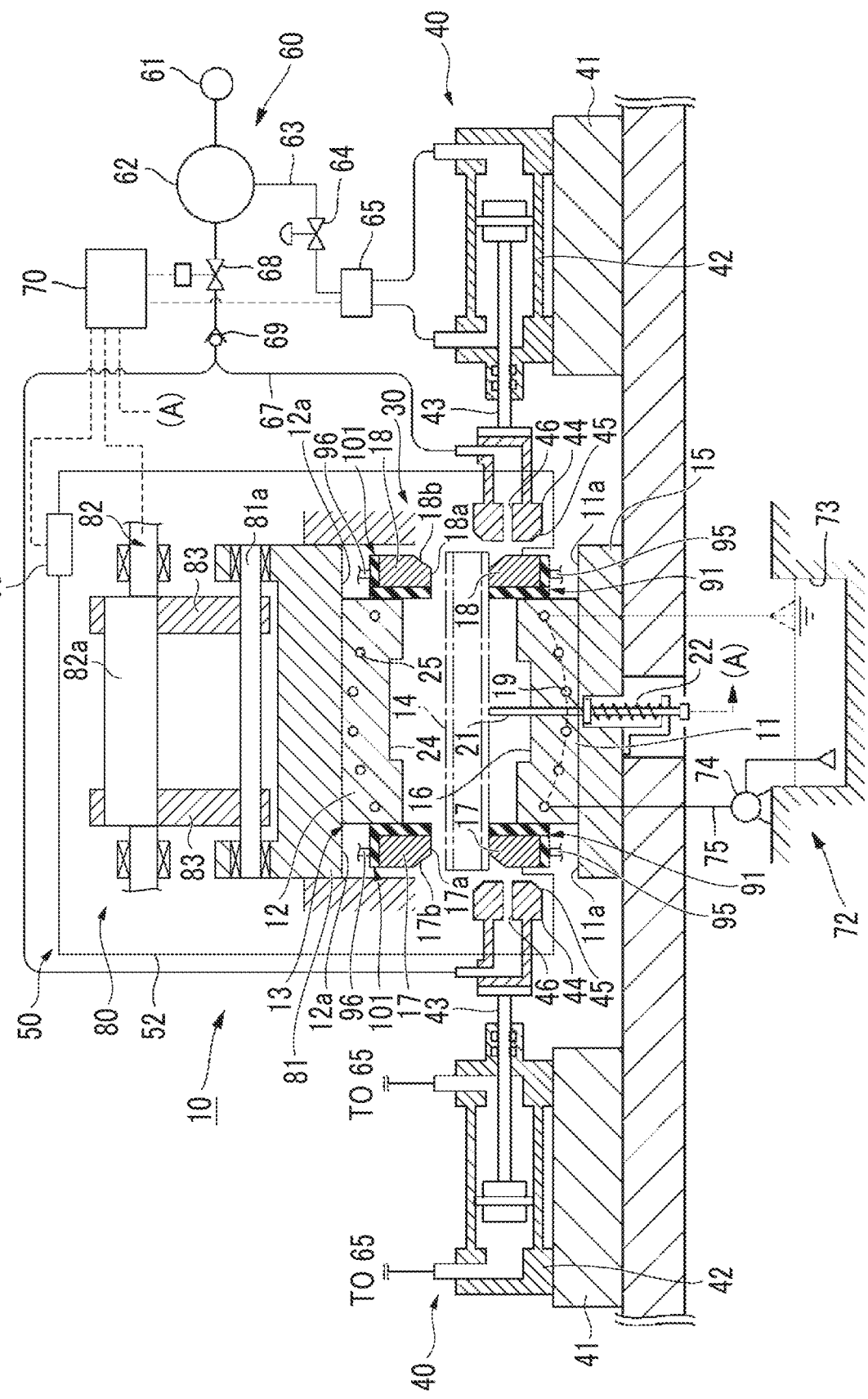
FIG. 1 is a schematic configuration view showing a forming device according to an embodiment of the present invention.

The metal pipe with a flange that is formed by means of the forming device as described above is welded to another member at the flange portion. At this time, welding may be performed with the flange portion being pressed against the other member. In a case where the hardness of the flange portion is excessively high at this time, it may be difficult to perform the welding while applying pressure.

It is desirable to provide a forming device, a forming method, and a metal pipe with which it is possible to easily perform welding in a case where welding is to be performed with a flange portion being pressed against another member.

The forming device according to the embodiment of the present invention includes the hardness lowering portion which lowers the hardness of the flange portion to be lower than the hardness of the pipe portion. Accordingly, it is possible to lower the hardness of the flange portion by means of the hardness lowering portion, without lowering the hardness of the pipe portion. Accordingly, it is possible to achieve a state where it is easy to perform welding with the flange portion being pressed, while ensuring the strength of the pipe portion which is required to have a high strength. Accordingly, it is possible to easily perform welding in a case where welding is to be performed with the flange portion being pressed against another member.

The forming device may further include a first die and a second die, which are paired with each other and include a pipe forming surface for formation of the pipe portion and a flange forming surface for formation of the flange portion, and the hardness lowering portion may be composed of a temperature control portion which makes a temperature of the flange forming surface at a time of formation higher than a temperature of the pipe forming surface. Accordingly, the temperature control portion makes the temperature of the flange forming surface at the time of formation higher than the temperature of the pipe forming surface and thus a cooling time at the time of contact between the flange portion and the flange forming surface becomes long. Since the cooling time becomes long, there is a decrease in hardenability at the flange portion and the hardness thereof becomes lower than that of the pipe portion.

In the forming device, the temperature control portion may be intermittently formed at the flange forming surface along a longitudinal direction of the flange forming surface. Accordingly, it is possible to ensure a high strength by lowering the hardness of a portion of the flange portion in the longitudinal direction at which welding is performed, without lowering the hardness of the other portion thereof.

In the forming device, the hardness lowering portion may be composed of a cooling portion which cools a portion of the metal pipe material in a state of being heated before a start of formation, the portion be coming the flange portion. Accordingly, the portion that becomes the flange portion is cooled in advance before formation is started and thus the maximum reachable temperature at the portion is made low. Therefore, there is a decrease in hardenability of the flange portion and thus it is possible to lower the hardness thereof.

In the forming device, the cooling portion may perform cooling by bringing a solid body into contact with the portion of the metal pipe material that becomes the flange portion. Accordingly, the solid body absorbs heat from the portion that becomes the flange portion and thus it is possible to cool the portion.

According to the forming method in the other embodiment of the present invention, it is possible to obtain operations and effects similar to those of the above-described forming device.

According to the metal pipe in the still another embodiment of the present invention, it is possible to achieve a state where it is easy to perform welding with the flange portion being pressed, while ensuring the strength of the pipe portion which is required to have a high strength. Accordingly, it is possible to easily perform welding in a case where welding is to be performed with the flange portion being pressed against another member.

In the metal pipe, a high-hardness portion and a low-hardness portion, which are different from each other in hardness, may be formed at the flange portion and a hardness of the low-hardness portion may be lower than a hardness of the high-hardness portion. Accordingly, it is possible to facilitate welding by forming a portion at which welding is performed as the low-hardness portion and to ensure a strength by forming the other portion as the high-hardness portion.

In the metal pipe, the low-hardness portion may be intermittently formed at the flange portion along a longitudinal direction of the flange portion. Accordingly, it is possible to ensure a high strength by forming a portion of the flange portion in the longitudinal direction at which welding is performed as the low-hardness portion and forming the other portion thereof as the high-hardness portion.

Hereinafter, preferred embodiments of a forming device according to the present invention will be described with reference to the drawings. In addition, in each drawing, the same reference numerals are assigned to the same portions or the corresponding portions, and repeated descriptions thereof are omitted.

Configuration of Forming Device

FIG. 1 is a schematic configuration view of a forming device according to the present embodiment. As shown in FIG. 1, a forming device 10 for forming a metal pipe includes a forming die 13 including an upper die (a first die) 12 and a lower die (a second die) 11, a drive mechanism 80 which moves at least one of the upper die 12 and the lower die 11, a pipe holding mechanism 30 which holds a metal pipe material 14 disposed between the upper die 12 and the lower die 11, a heating mechanism 50 which energizes the metal pipe material 14 held by the pipe holding mechanism 30 to heat the metal pipe material 14, a gas supply unit 60 which supplies a high-pressure gas (a gas) into the metal pipe material 14 which is held between the upper die 12 and the lower die 11 and is heated, a pair of gas supply mechanisms 40 and 40 for supplying the gas from the gas supply unit 60 into the metal pipe material 14 held by the pipe holding mechanism 30, and a water circulation mechanism 72 which forcibly water-cools the forming die 13 and the forming device 10 is configured to include a controller 70 which controls driving of the drive mechanism. 80, driving of the pipe holding mechanism 30, driving of the heating mechanism 50, and gas supply of the gas supply unit 60.

The lower die 11, which is one part of the forming die 13, is fixed to a base 15. The lower die 11 is composed of a large steel block and includes a rectangular cavity (a recessed portion) 16 on an upper surface of the lower die 11, for example. A cooling water passage 19 is formed in the lower die 11, and the lower die 11 includes a thermocouple 21 which is inserted from below at an approximately center. The thermocouple 21 is supported to be movable upward or downward by a spring 22.

Furthermore, spaces 11a are provided near right and left ends (right and left ends in FIG. 1) of the lower die 11 and electrodes 17 and 18 (lower electrodes or like), which are movable portions of the pipe holding mechanism 30 and will be described later, are disposed in the spaces 11a to be movable forward or rearward vertically. In addition, the metal pipe material 14 is placed on the lower electrodes 17 and 18 and the lower electrodes 17 and 18 come into contact with the metal pipe material 14 disposed between the upper die 12 and the lower die 11. As a result, the lower electrodes 17 and 18 are electrically connected to the metal pipe material 14.

Insulating materials 91 for preventing energization are provided between the lower die 11 and the lower electrode 17, under the lower electrode 17, between the lower die 11 and the lower electrode 18, and under the lower electrode 18. Each insulating material 91 is fixed to an advancing and retreating rod 95, which is a movable portion of an actuator (not shown) constituting the pipe holding mechanism 30. The actuator is for moving the lower electrodes 17 and 18 or the like upward or downward and a fixed portion of the actuator is held on the base 15 side together with the lower die 11.

The upper die 12, which is the other part of the forming die 13, is fixed to a slide 81 (which will be described later) constituting the drive mechanism 81. The upper die 12 is composed of a large steel block, a cooling water passage 25 is formed in the upper die 12, and the upper die 12 includes a rectangular cavity (a recessed portion) 24 on a lower surface of the upper die 12, for example. The cavity 24 is provided at a position facing the cavity 16 of the lower die 11.

As with the lower die 11, spaces 12a are provided near right and left ends (right and left ends in FIG. 1) of the upper die 12 and electrodes 17 and 18 (upper electrodes or like), which are movable portions of the pipe holding mechanism 30 and will be described later, are disposed in the spaces 12a to be movable forward or rearward vertically. In addition, in a state where the metal pipe material 14 is placed on the lower electrodes 17 and 18, the upper electrodes 17 and 18 come into contact with the metal pipe material 14 disposed between the upper die 12 and the lower die 11. As a result, the upper electrodes 17 and 18 are electrically connected to the metal pipe material 14.

Insulating materials 101 for preventing energization are provided between the upper die 12 and the upper electrode 17, on the upper electrode 17, between the upper die 12 and the upper electrode 18, and on the upper electrode 18. Each insulating material 101 is fixed to an advancing and retreating rod 96, which is a movable portion of an actuator constituting the pipe holding mechanism 30. The actuator is for moving the upper electrodes 17 and 18 or the like upward or downward and a fixed portion of the actuator is held on the slide 81 side of the drive mechanism 80 together with the upper die 12.

At a right part of the pipe holding mechanism 30, a semi-arc-shaped concave groove 18a corresponding to an outer peripheral surface of the metal pipe material 14 is formed (refer to FIGS. 2A to 2C) on each of surfaces of the electrodes 18 and 18 that face each other and the metal pipe material 14 can be placed so as to be exactly fitted into portions of the concave grooves 18a. At the right part of the pipe holding mechanism 30, as with the concave grooves 18a, a semi-arc-shaped concave groove corresponding to the outer peripheral surface of the metal pipe material 14 is formed on each of exposed surfaces of the insulating materials 91 and 101 that face each other. In addition, front surfaces (surfaces facing the outside of the die) of the electrodes 18 are formed with tapered concave surfaces 18b which are recessed with peripheries thereof inclined to form a shape tapered toward the concave grooves 18a. Accordingly, if the metal pipe material 14 is clamped from above and below at the right part of the pipe holding mechanism 30, the electrodes 18 can exactly surround the outer periphery of a right end portion of the metal pipe material 14 so as to come into close contact with the entire circumference of the right end portion of the metal pipe material 14.

At a left part of the pipe holding mechanism 30, a semi-arc-shaped concave groove 17a corresponding to the outer peripheral surface of the metal pipe material 14 is formed (refer to FIGS. 2A to 2C) on each of surfaces of the electrodes 17 and 17 that face each other and the metal pipe material 14 can be placed so as to be exactly fitted into portions of the concave grooves 17a. At the left part of the pipe holding mechanism 30, as with the concave grooves 18a, a semi-arc-shaped concave groove corresponding to the outer peripheral surface of the metal pipe material 14 is formed on each of exposed surfaces of the insulating materials 91 and 101 that face each other. In addition, front surfaces (surfaces facing the outside of the die) of the electrodes 17 are formed with tapered concave surfaces 17b which are recessed with peripheries thereof inclined to form a shape tapered toward the concave grooves 17a. Accordingly, if the metal pipe material 14 is clamped from above and below at the left part of the pipe holding mechanism 30, the electrodes 17 can exactly surround the outer periphery of a left end portion of the metal pipe material 14 so as to come into close contact with the entire circumference of the left end portion of the metal pipe material 14.

As shown in FIG. 1, the drive mechanism 80 includes the slide 81 which moves the upper die 12 such that the upper die 12 and the lower die 11 are joined to each other, a shaft 82 which generates a driving force for moving the slide 81, and a connecting rod 83 for transmitting the driving force generated by the shaft 82 to the slide 81. The shaft 82 extends in a lateral direction above the slide 81, is supported to be rotatable, and includes an eccentric crank 82a which protrudes from right and left ends at a position separated from the axis of the shaft 82 and extends in the lateral direction. The eccentric crank 82a and a rotary shaft 81a which is provided above the slide 81 and extends in the lateral direction are connected to each other by the connecting rod 83. In the case of the drive mechanism 80, the upward and downward movement of the slide 81 can be controlled by the controller 70 controlling rotation of the shaft 82 such that the height of the eccentric crank 82a in a vertical direction is changed and the positional change of the eccentric crank 82a is transmitted to the slide 81 via the connecting rod 83. Here, oscillation (a rotary motion) of the connecting rod 83 generated when the positional change of the eccentric crank 82a is transmitted to the slide 81 is absorbed by the rotary shaft 81a. Note that, the shaft 82 is rotated or stopped in accordance with the driving of a motor or the like controlled by the controller 70, for example.

FIGS. 3A to 3D are sectional views of the forming die 13 shown in FIG. 1. As shown in FIGS. 3A to 3D, steps are provided on both the upper surface of the lower die 11 and the lower surface of the upper die 12.

If a bottom surface of the center cavity 16 of the lower die 11 is defined as a reference line LV2, the step is formed on the upper surface of the lower die 11 by a first protrusion 11b, a second protrusion 11c, a third protrusion 11d, and a fourth protrusion 11e. The first protrusion 11b and the second protrusion 11c are formed on a right side (right side in FIGS. 3A to 3D and a rear side of a paper surface in FIG. 1) of the cavity 16, and the third protrusion 11d and the fourth protrusion 11e are formed on a left side (left side in FIGS. 3A to 3D and a front side of the paper surface in FIG. 1) of the cavity 16. The second protrusion 11c is located between the cavity 16 and the first protrusion 11b. The third protrusion 11d is located between the cavity 16 and the fourth protrusion 11e. The second protrusion 11c and the third protrusion 11d respectively protrude toward the upper die 12 side from the first protrusion 11b and the fourth protrusion 11e. Protrusion amounts of the first protrusion 11b and the fourth protrusion 11e from the reference line LV2 are approximately the same as each other, and protrusion amounts of the second protrusion 11c and the third protrusion 11d from the reference line LV2 are approximately the same as each other.

Meanwhile, if a bottom surface of the center cavity 24 of the upper die 12 is defined as a reference line LV1, the step is formed on the lower surface of the upper die 12 by a first protrusion 12b, a second protrusion 12c, a third protrusion 12d, and a fourth protrusion 12e. The first protrusion 12b and the second protrusion 12c are formed on a right side (a right side in FIGS. 3A to 3D) of the cavity 24, and the third protrusion 12d and the fourth protrusion 12e are formed on a left side (a left side in FIGS. 3A to 3D) of the cavity 24. The second protrusion 12c is located between the cavity 24 and the first protrusion 12b. The third protrusion 12d is located between the cavity 24 and the fourth protrusion 12e. The first protrusion 12b and the fourth protrusion 12e respectively protrude toward the lower die 11 side from the second protrusion 12c and the third protrusion 12d. Protrusion amounts of the first protrusion 12b and the fourth protrusion 12e from the reference line LV1 are approximately the same as each other, and protrusion amounts of the second protrusion 12c and the third protrusion 12d from the reference line LV1 are approximately the same as each other.

In addition, the first protrusion 12b of the upper die 12 faces the first protrusion 11b of the lower die 11, the second protrusion 12c of the upper die 12 faces the second protrusion 11c of the lower die 11, the cavity 24 of the upper die 12 faces the cavity 16 of the lower die 11, the third protrusion 12d of the upper die 12 faces the third protrusion 11d of the lower die 11, and the fourth protrusion 12e of the upper die 12 faces the fourth protrusion 11e of the lower die 11. In addition, a protrusion amount (a protrusion amount of the fourth protrusion 12e with respect to the third protrusion 12d) of the first protrusion 12b with respect to the second protrusion 12c in the upper die 12 is larger than a protrusion amount (a protrusion amount of the third protrusion 11d with respect to the fourth protrusion 11e) of the second protrusion 11c with respect to the first protrusion 11b in the lower die 11. Accordingly, when the upper die 12 and the lower die 11 are fitted to each other, spaces are respectively formed between the second protrusion 12c of the upper die 12 and the second protrusion 11c of the lower die 11 and between the third protrusion 12d of the upper die 12 and the third protrusion 11d of the lower die 11 (refer to FIG. 3C). In addition, when the upper die 12 and the lower die 11 are fitted to each other, a space is formed between the cavity 24 of the upper die 12 and the cavity 16 of the lower die 11 (refer to FIG. 3C).

Figure 3A:
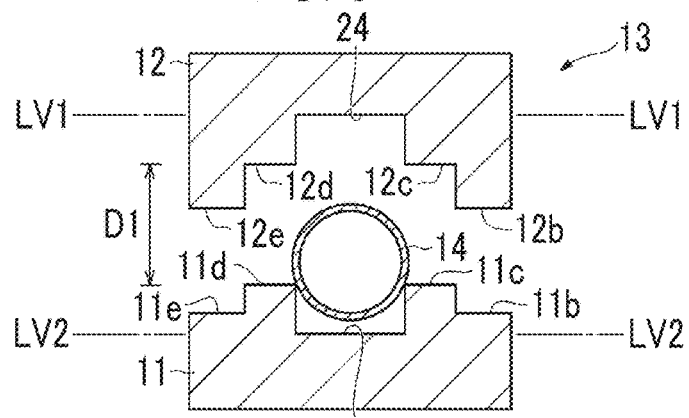
FIGS. 3A to 3D are sectional views of a forming die.
Figure 3B:
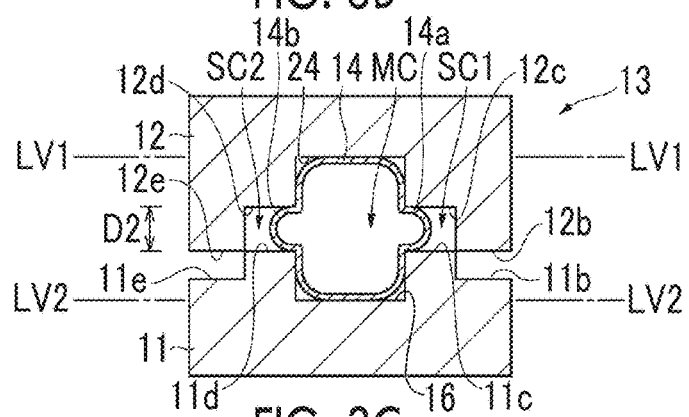
Figure 3C:
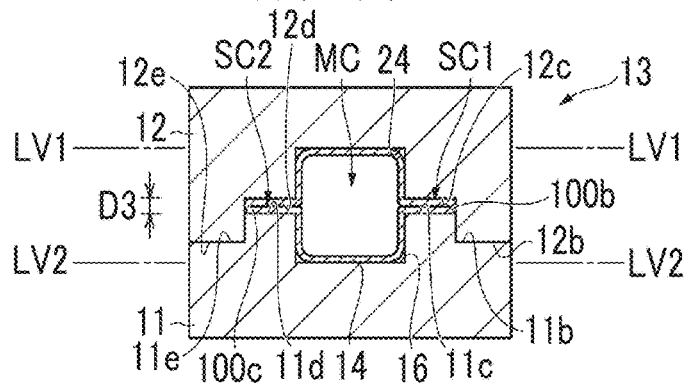
Figure 3D:
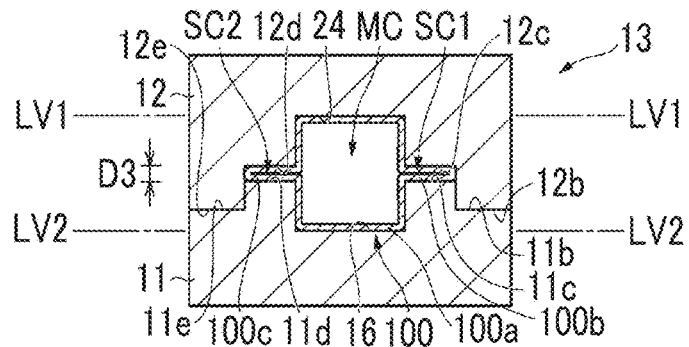

More specifically, when blow forming is performed, at a time before the lower die 11 and the upper die 12 are joined and fitted to each other, as shown in FIG. 3B, a main cavity portion (first cavity portion) MC is formed between a bottom surface (a surface be coming the reference line LV1) of the cavity 24 of the upper die 12 and a bottom surface (a surface be coming the reference line LV2) of the cavity 16 of the lower die 11. In addition, a sub cavity portion (second cavity portion) SC1 which communicates with the main cavity portion MC and has a volume smaller than that of the main cavity portion MC is formed between the second protrusion 12c of the upper die 12 and the second protrusion 11c of the lower die 11. Similarly, a sub cavity portion (second cavity portion) SC2 which communicates with the main cavity portion MC and has a volume smaller than that of the main cavity portion MC is formed between the third protrusion 12d of the upper die 12 and the third protrusion 11d of the lower die 11. The main cavity portion MC is a portion which forms a pipe portion 100a in the metal pipe 100 and the sub cavity portions SC1 and SC2 are portions which respectively form flange portions 100b and 100c in the metal pipe 100 (refer to FIGS. 3C and 3D). In addition, as shown in FIGS. 3C and 3D, in a case where the lower die 11 and the upper die 12 are joined (fitted) to each other so as to be completely closed, the main cavity portion MC and the sub cavity portions SC1 and SC2 are sealed in the lower die 11 and the upper die 12.

As shown in FIG. 1, the heating mechanism 50 includes a power supply unit 55 and a busbar 52 which electrically connects the power supply unit 55 and the electrodes 17 and 18 to each other. The power supply unit 55 includes a DC power source and a switch and can energize the metal pipe material 14 via the busbar 52 and the electrodes 17 and 18 in a state where the electrodes 17 and 18 are electrically connected to the metal pipe material 14. Note that, here, the busbar 52 is connected to the lower electrodes 17 and 18.

In the heating mechanism 50, a DC current output from the power supply unit 55 is transmitted via the busbar 52 and input to the electrodes 17. Then, the DC current passes through the metal pipe material 14 and is input to the electrodes 18. Then, the DC current is transmitted via the busbar 52 and input to the power supply unit 55.

Figure 2A:
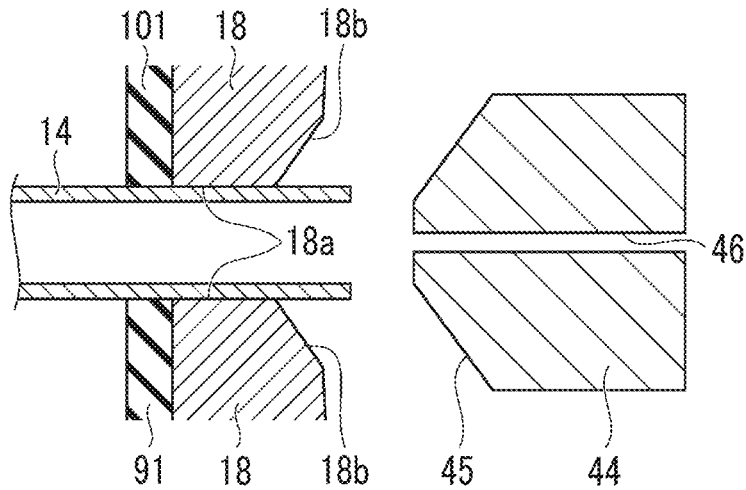
FIGS. 2A to 2C are enlarged views of a periphery of an electrode.
Figure 2B:
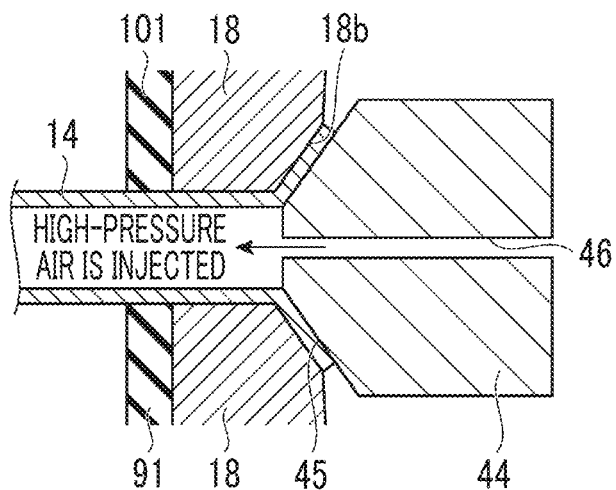
Figure 2C:
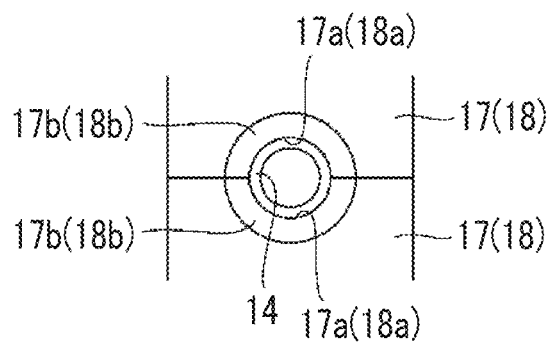

Each of the pair of gas supply mechanisms 40 includes a cylinder unit 42, a cylinder rod 43 which moves forward and rearward in accordance with an operation of the cylinder unit 42, and a seal member 44 connected to a tip of the cylinder rod 43 on the pipe holding mechanism 30 side. The cylinder unit 42 is placed on and fixed to a block 41. At a tip of each seal member 44, a tapered surface 45 is formed to be tapered and the tip is configured to have a shape matching the tapered concave surfaces 17b and 18b of the electrodes 17 and 18 (refer to FIGS. 2A to 2C). Each seal member 44 is provided with a gas passage 46 which extends toward the tip from the cylinder unit 42 side. More specifically, as shown in FIGS. 2A and 2B, a high-pressure gas supplied form the gas supply unit 60 flows through the gas passage 46.

The gas supply unit 60 includes a gas source 61, an accumulator 62 in which the gas supplied by the gas source 61 is stored, a first tube 63 which extends from the accumulator 62 to the cylinder unit 42 of the gas supply mechanism 40, a pressure control valve 64 and a switching valve 65 which are interposed in the first tube 63, a second tube 67 which extends from the accumulator 62 to the gas passage 46 formed in the seal member 44, and a pressure control valve 68 and a check valve 69 which are interposed in the second tube 67. The pressure control valve 64 plays a role of supplying gas of an operation pressure adapted to a pressing force of the seal member 44 with respect to the metal pipe material 14 to the cylinder unit 42. The check valve 69 plays a role of preventing a high-pressure gas from back-flowing in the second tube 67. The pressure control valve 68 interposed in the second tube 67 plays a role of supplying a gas of an operation pressure for expanding the metal pipe material 14 to the gas passage 46 of the seal member 44 by being controlled by the controller 70.

The controller 70 can control the pressure control valve 68 of the gas supply unit 60 such that a gas of a desired operation pressure is supplied into the metal pipe material 14. In addition, with information transmitted to the controller 70 from (A) shown in FIG. 1, the controller 70 acquires temperature information from the thermocouple 21 and controls the drive mechanism 80, the power supply unit 55, and the like.

The water circulation mechanism 72 includes a water tank 73 which stores water, a water pump 74 which pumps up the water stored in the water tank 73, pressurizes the water, and sends the water to the cooling water passage 19 of the lower die 11 and the cooling water passage 25 of the upper die 12, and a pipe 75. Although omitted, a cooling tower for lowering a water temperature and a filter for purifying the water may be interposed in the pipe 75.

Forming Method of Metal Pipe Using Forming Device

Next, a forming method of the metal pipe using the forming device 10 will be described. First, the quenchable steel type cylindrical metal pipe material 14 is prepared. For example, the metal pipe material 14 is placed on (inserted) the electrodes 17 and 18 provided on the lower die 11 side by means of a robot arm or the like. Since the concave grooves 17a and 18a are formed on the electrodes 17 and 18, the metal pipe material 14 is located by the concave grooves 17a and 18a.

Next, the controller 70 controls the drive mechanism 80 and the pipe holding mechanism 30 such that the metal pipe material 14 is held by the pipe holding mechanism 30.

Specifically, the drive mechanism 80 is driven such that the upper die 12 held on the slide 81 side and the upper electrodes 17 and 18 are moved to the lower die 11 side and the actuator that can move the upper electrodes 17 and 18 and the lower electrodes 17 and 18 included in the pipe holding mechanism 30 forward and rearward is operated such that peripheries of the both end portions of the metal pipe material 14 are clamped from above and below by the pipe holding mechanism 30. The clamping is performed in an aspect in which the concave grooves 17a and 18a formed on the electrodes 17 and 18 and the concave grooves formed on the insulating materials 91 and 101 are provided such that the electrodes 17 and 18 come into close contact with the vicinity of each of the both end portions of the metal pipe material 14 over the entire circumference.

Note that, at this time, as shown in FIG. 2A, an end portion of the metal pipe material 14 that is on the electrode 18 side protrudes toward the seal member 44 side beyond a boundary between the concave grooves 18a of the electrodes 18 and the tapered concave surfaces 18b in a direction in which the metal pipe material 14 extends. Similarly, an end portion of the metal pipe material 14 that is on the electrode 17 side protrudes toward the seal member 44 side beyond a boundary between the concave grooves 17a of the electrodes 17 and the tapered concave surfaces 17b in the direction in which the metal pipe material 14 extends. In addition, lower surfaces of the upper electrodes 17 and 18 and upper surfaces of the lower electrodes 17 and 18 are in contact with each other. However, the present invention is not limited to a configuration in which the electrodes 17 and 18 come into close contact with the entire circumferences of the both end portions of the metal pipe material 14. That is, the electrodes 17 and 18 may abut against a portion of the metal pipe material 14 in a circumferential direction.

Next, the controller 70 controls the heating mechanism 50 so as to heat the metal pipe material 14. Specifically, the controller 70 controls the power supply unit 55 of the heating mechanism 50 such that power is supplied. As a result, power transmitted to the lower electrodes 17 and 18 via the busbar 52 is supplied to the upper electrodes 17 and 18 clamping the metal pipe material 14 and the metal pipe material 14 and the metal pipe material 14 generates heat due to Joule heat caused by the resistance of the metal pipe material 14. That is, the metal pipe material 14 enters an electrically heated state.

Next, the controller 70 controls the drive mechanism 80 such that the forming die 13 is closed with respect to the heated metal pipe material 14. Accordingly, the cavity 16 of the lower die 11 and the cavity 24 of the upper die 12 are combined with each other such that the metal pipe material 14 is disposed in a cavity portion between the lower die 11 and the upper die 12 and is sealed.

Thereafter, the cylinder unit 42 of the gas supply mechanism 40 is operated such that both ends of the metal pipe material 14 are sealed with the seal members 44 moving forward. At this time, as shown in FIG. 2B, the seal member 44 is pressed against the end portion of the metal pipe material 14 that is on the electrode 18 side and thus a portion of the metal pipe material 14 that protrudes toward the seal member 44 side beyond the boundary between the concave grooves 18a of the electrodes 18 and the tapered concave surfaces 18b is deformed into a funnel shape to match the tapered concave surfaces 18b. Similarly, the seal member 44 is pressed against the end portion of the metal pipe material 14 that is on the electrode 17 side and thus a portion of the metal pipe material 14 that protrudes toward the seal member 44 side beyond the boundary between the concave grooves 17a of the electrodes 17 and the tapered concave surfaces 17b is deformed into a funnel shape to match the tapered concave surfaces 17b. After the sealing is finished, a high-pressure gas is blown into the metal pipe material 14 and the heated and softened metal pipe material 14 is formed in accordance with the shape of the cavity portion.

The metal pipe material 14 is heated to a high temperature (approximately 950° C.) and softened and thus the gas supplied into the metal pipe material 14 thermally expands. Accordingly, for example, compressed air may be used as the gas to be supplied such that the metal pipe material 14 of 950° C. is easily expanded by compressed air thermally expanded.

An outer peripheral surface of the blow-formed and expanded metal pipe material 14 comes into contact with the cavity 16 of the lower die 11 so as to be rapidly cooled and comes into contact with the cavity 24 of the upper die 12 so as to be rapidly cooled (the upper die 12 and the lower die 11 have a large heat capacity and are controlled to a low temperature, and thus, if the metal pipe material 14 comes into contact with the upper die 12 and the lower die 11, a heat of a pipe surface is taken to the die side at once) at the same time so that quenching is performed. The above-described cooling method is referred to as die contact cooling or die cooling. Immediately after being rapidly cooled, austenite transforms into martensite (hereinafter, transformation from austenite to martensite is referred to as martensitic transformation). The cooling rate is made low in a second half of the cooling, and thus, martensite transforms into another structure (such as troostite, sorbite, or the like) due to recuperation. Therefore, it is not necessary to separately perform tempering treatment. In addition, in the present embodiment, the cooling may be performed by supplying a cooling medium into, for example, the cavity 24, instead of or in addition to the cooling of the die. For example, cooling may be performed by bring the metal pipe material 14 into contact with the dies (the upper die 12 and the lower die 11) until a temperature at which the martensitic transformation starts is reached and the dies may be opened thereafter with a cooling medium (cooling gas) blown onto the metal pipe material 14 such that martensitic transformation occurs.

A metal pipe having an approximately rectangular main body portion is obtained when cooling is performed and dies are opened after blow forming is performed with respect to the metal pipe material 14 as described above, for example.

Description on Hardness Lowering Portion

Figure 4:
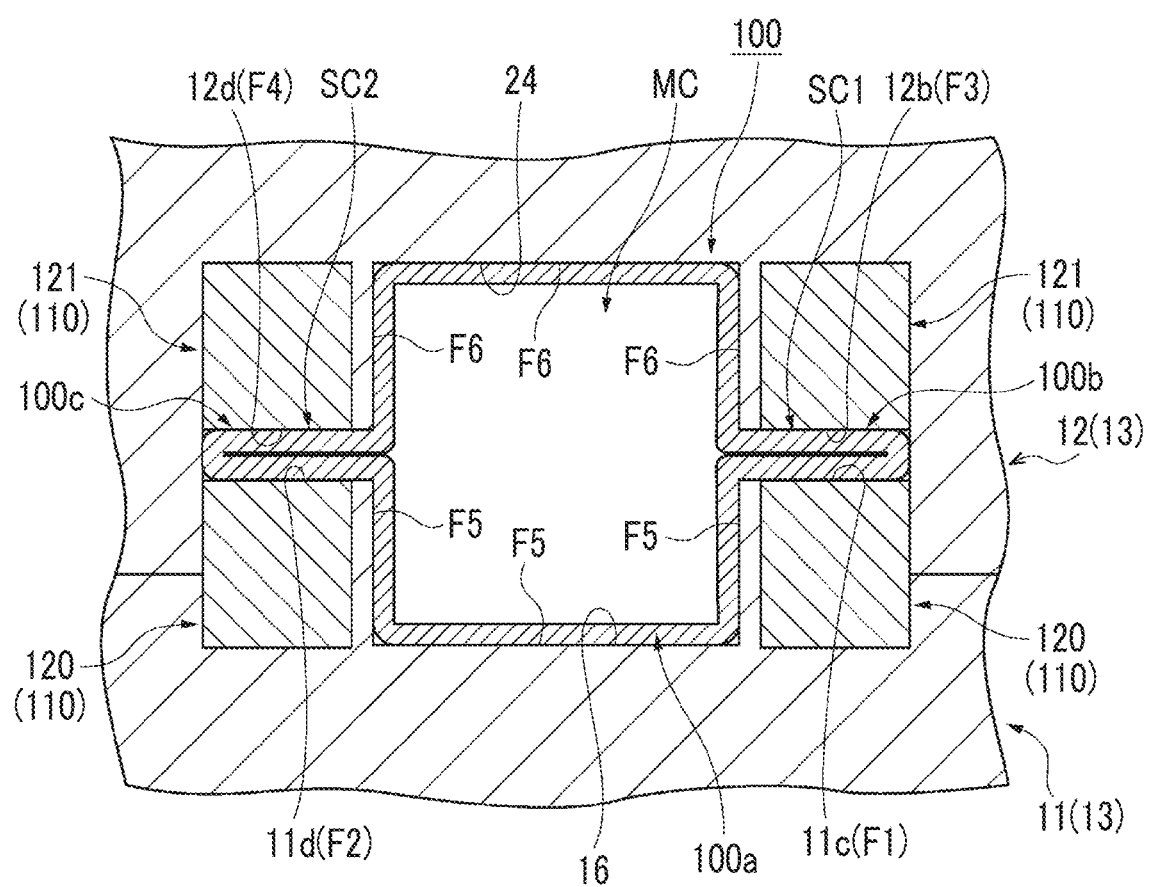
FIG. 4 is an enlarged sectional view of the forming die.

Here, the forming device 10 includes a hardness lowering portion 110 which lowers the hardnesses of the flange portions 100b and 100c to be lower than the hardness of the pipe portion 100a. The configuration of the hardness lowering portion 110 will be described with reference to FIG. 4. FIG. 4 is an enlarged sectional view of the forming die 13.

As shown in FIG. 4, the lower die 11 and the upper die 12 include flange forming surfaces F1 and F3 for forming the flange portion 100b. The flange forming surfaces F1 and F3 face each other and are surfaces which constitute the sub cavity portion SC1. The lower die 11 and the upper die 12 include flange forming surfaces F2 and F4 for forming the flange portion 100c. The flange forming surfaces F2 and F4 face each other and are surfaces which constitute the sub cavity portion SC2. The lower die 11 and the upper die 12 include pipe forming surfaces F5 and F6 for forming the pipe portion 100a. The pipe forming surfaces F5 and F6 are surfaces that constitute the main cavity portion MC. Here, the flange forming surface F1 of the sub cavity portion SC1 of the lower die 11 corresponds to an upper surface of the second protrusion 11c. The flange forming surface F2 of the sub cavity portion SC2 of the lower die 11 corresponds to an upper surface of the third protrusion 11d. The flange forming surface F3 of the sub cavity portion SC1 of the upper die 12 corresponds to a lower surface of the second protrusion 12c. The flange forming surface F4 of the sub cavity portion SC2 of the upper die 12 corresponds to an upper surface of the fourth protrusion 12e. The pipe forming surfaces F5 correspond to a bottom surface and both side surfaces of the cavity 16. The pipe forming surfaces F6 correspond to a bottom surface and both side surfaces of the cavity 24.

The hardness lowering portion 110 is composed of temperature control portions 120 and 121 which make the temperatures of the flange forming surfaces F1, F2, F3, and F4 at the time of formation higher than the temperatures of the pipe forming surfaces F5 and F6. In a case where the temperatures of the flange forming surfaces F1, F2, F3, and F4 at the time of formation are high, a cooling rate at the time of contact between the metal pipe material and the flange forming surfaces F1, F2, F3, and F4 is made low. Therefore, there is a decrease in hardenability since a cooling time with respect to the flange portions 100b and 100c becomes long and thus there is a decrease in hardness of the flange portions 100b and 100c. There is no particular limitation as to what temperature the temperature control portions 120 and 121 bring the flange forming surfaces F1, F2, F3, and F4. For example, regarding the temperature control portions 120 and 121, it is possible to sufficiently lower the hardnesses of the flange portions 100b and 100c when the flange forming surfaces F1, F2, F3, and F4 are brought to a temperature of about 500 to 1000° C. At this time, a cooling rate at the time of die contact can be set to at least 10° C. or less.

The temperature control portions 120 are formed at positions on the lower die 11 that correspond to the flange forming surfaces F1 and F2. However, in order to prevent an increase in temperature of the pipe forming surfaces F5, the temperature control portions 120 are not provided in base end side edge portions of the flange forming surfaces F1 and F2. The temperature control portions 120 are formed on regions outward of the base end side edge portions in a width direction. Note that, although the temperature control portions 120 are formed over the entire regions outward of the base end side edge portions in the width direction, the temperature control portions 120 may be formed only on regions where at least spot welding may be performed. For example, no temperature control portion 120 may be formed on edge portions near tips of the flange portions 100b and 100c. In addition, the sizes of the temperature control portions 120 in the vertical direction are not limited to that shown in the drawings.

The temperature control portions 121 are formed at positions on the upper die 12 that correspond to the flange forming surfaces F3 and F4. However, in order to prevent the temperatures of the pipe forming surfaces F5 from becoming high, the temperature control portions 121 are not provided in base end side edge portions of the flange forming surfaces F3 and F4. The temperature control portions 121 are formed on regions outward of the base end side edge portions in the width direction. Note that, although the temperature control portions 121 are formed over the entire regions outward of the base end side edge portions in the width direction, the temperature control portions 121 may be formed only on regions where at least spot welding may be performed. For example, no temperature control portion 121 may be formed on edge portions near the tips of the flange portions 100b and 100c. In addition, the sizes of the temperature control portions 121 in the vertical direction are not limited to that shown in the drawings.

Figure 5A:
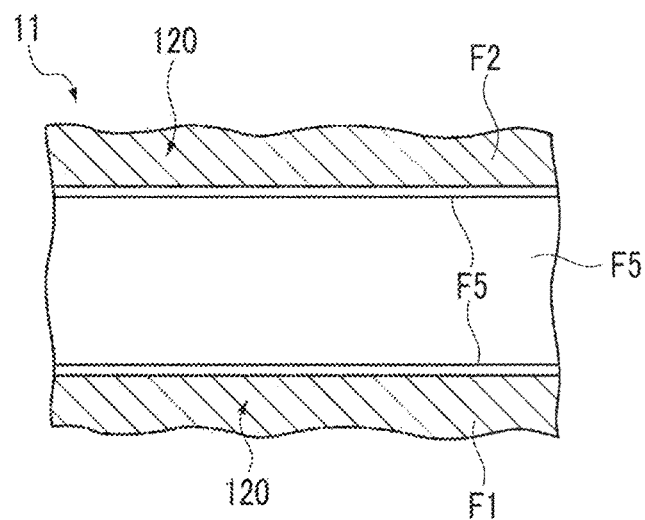
FIG. 5A is a view of flange forming surfaces as seen from above and FIG. 5B is a view of a metal pipe as seen from above.
Figure 5B:
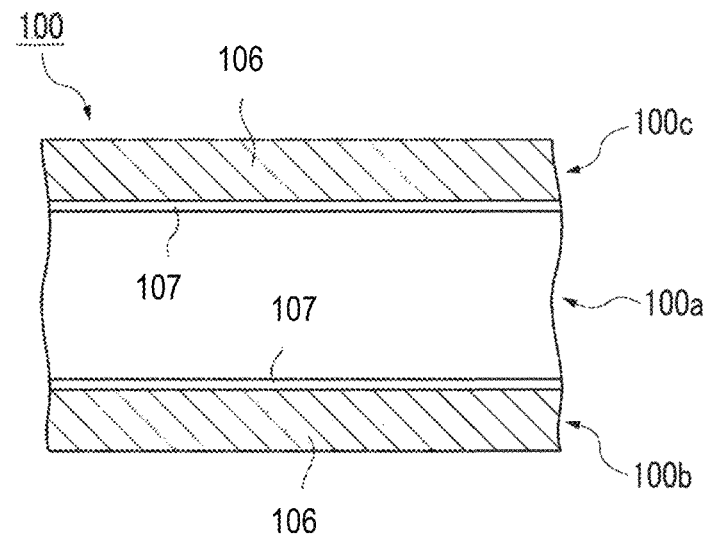

FIG. 5A is a view of the flange forming surfaces F1 and F2 of the lower die 11 as seen from above. FIG. 5B is a view of the metal pipe 100 as seen from above. Since the temperature control portions 121 of the upper die 12 have the same configuration as the temperature control portions 120 of the lower die 11, the description thereof will be omitted. As shown in FIG. 5A, the temperature control portions 120 continuously extend along a longitudinal direction of the flange forming surfaces F1 and F2. Accordingly, the metal pipe 100 as shown in FIG. 5B is formed.

As shown in FIG. 5B, high-hardness portions 107 and low-hardness portions 106 which are different from each other in hardness are formed at the flange portions 100b and 100c. The low-hardness portions 106 are lower than the high-hardness portions 107 in hardness. Accordingly, the hardnesses of the flange portions 100b and 100c of the metal pipe 100 are made lower than that of the pipe portion 100a. The low-hardness portions 106 are formed by areas on the flange forming surfaces F1, F2, F3, and F4 of the forming die 13 at which the temperature control portions 120 and 121 are formed. The high-hardness portions 107 and the pipe portion 100a are formed by areas on a forming surface of the forming die 13 at which no temperature control portions 120 and 121 are formed. Therefore, the high-hardness portions 107 and the pipe portion 100a have a high hardness since the high-hardness portions 107 and the pipe portion 100a are quenched by being rapidly cooled due to contact with a cooled forming surface. The low-hardness portions 106 have a low hardness since the low-hardness portions 106 are quenched (or not quenched) in a state where the cooling rate is lowered due to contact with a forming surface of which the temperature has been increased by the temperature control portions 120 and 121. Note that, the hardnesses of high-hardness portions 107 and the pipe portion 100a are set to about HV 400 to 500 and the hardnesses of the low-hardness portions 106 are set to about HV 100 to 300. Accordingly, it becomes easy to perform spot welding at the low-hardness portions 106.

Note that, a structure as shown in FIG. 6A may also be adopted. The temperature control portions 120 shown in FIG. 6A are intermittently formed at the flange forming surfaces F1 and F2 along the longitudinal direction of the flange forming surfaces F1 and F2. That is, at each of the flange forming surfaces F1 and F2, the temperature control portion 120 that has a predetermined length in the longitudinal direction is formed and another temperature control portion 120 is formed at an interval in the longitudinal direction. The pitch of the temperature control portions 120 may be set based on the pitch of spot welded portions SP at the time of fixation of the metal pipe 100 to another member, for example. Accordingly, the metal pipe 100 as shown in FIG. 6B is formed. The low-hardness portions 106 of the metal pipe 100 are intermittently formed at the flange portions 100b and 100c along a longitudinal direction of the flange portions 100b and 100c. At each of the flange portions 100b and 100c, the low-hardness portion 106 that has a predetermined length in the longitudinal direction is formed and another low-hardness portion 106 is formed with the high-hardness portion 107 interposed therebetween, the high-hardness portion 107 having a predetermined length in the longitudinal direction.

Figure 7A:
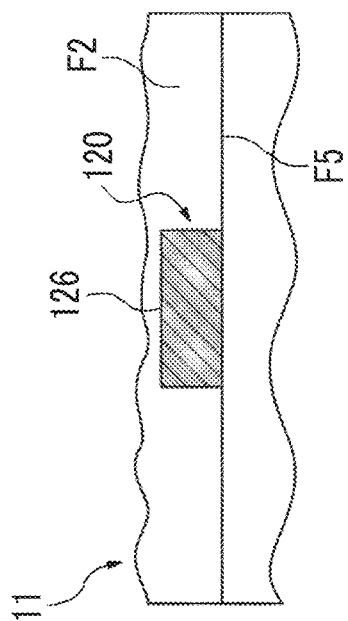
FIGS. 7A to 7D are schematic views showing a specific configuration of a temperature control portion.
Figure 7C:
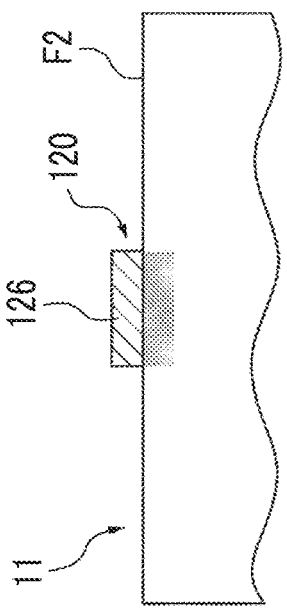
Figure 7B:
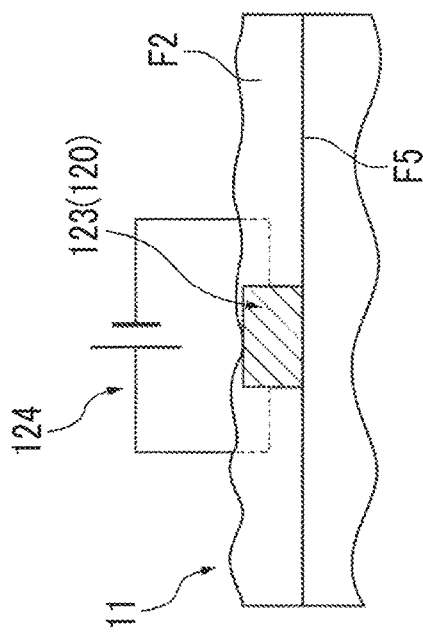
Figure 7D:
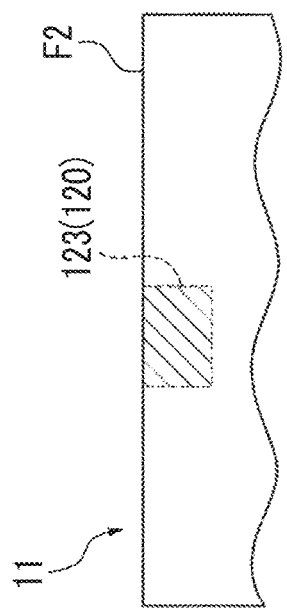

Next, a specific configuration of the temperature control portions 120 will be described with reference to FIG. 7A to 7D. Since the temperature control portions 121 of the upper die 12 have the same configuration as the temperature control portions 120 of the lower die 11, the description thereof will be omitted. FIG. 7A is a view of the lower die 11 as seen from above. FIG. 7B is a view of the lower die 11 as seen from a lateral side. The temperature control portion 120 is configured by embedding a member 123 formed of a different material from a member constituting the other portion of the lower die 11. As the member 123 constituting the temperature control portion 120, a member of which the electric resistance is high is adopted. An energization unit 124 for energization is connected to the member 123 constituting the temperature control portion 120. Accordingly, when the energization unit 124 energizes the member 123, the temperature of the temperature control portion 120 is made high. In addition, as the member 123 constituting the temperature control portion 120, a member having a cooling rate lower than that of another member of the lower die 11 may also be adopted. Accordingly, the temperature of the temperature control portion 120 is decreased slowly when the temperature control portion 120 is cooled by the water circulation mechanism 72 and thus the temperature of the temperature control portion 120 becomes higher than that of other portions at the time of formation. Alternatively, as shown in FIGS. 7C and 7D, a mechanism pressing a high-temperature member 126 may be provided at a position corresponding to the temperature control portion 120 such that the temperature of the temperature control portion 120 is made high partially. Note that, the high-temperature member 126 moves to a position at which no interference occurs at the time of formation.

Next, the operations and effects of the forming device 10 according to the present embodiment will be described.

The forming device 10 according to the present embodiment is the forming device 10 which expands the metal pipe material 14 to form the metal pipe 100 having the pipe portion 100a and the flange portions 100b and 100c, the forming device including the hardness lowering portion 110 which lowers the hardnesses of the flange portions 100b and 100c to be lower than the hardness of the pipe portion 100a.

The forming device 10 includes the hardness lowering portion 110 which lowers the hardnesses of the flange portions 100b and 100c to be lower than that of the pipe portion 100a. Accordingly, it is possible to lower the hardnesses of the flange portions 100b and 100c by means of the hardness lowering portions 110, without lowering the hardness of the pipe portion 100a. Accordingly, it is possible to achieve a state where it is easy to perform welding with the flange portions 100b and 100c being pressed, while ensuring the strength of the pipe portion 100a which is required to have a high strength. Accordingly, it is possible to easily perform welding in a case where welding is to be performed with the flange portions 100b and 100c being pressed against another member. In addition, since no excessive pressure is required when performing welding while applying pressure, it is possible to suppress generation of dust, wear of electrodes, uneven welding quality, or the like caused by application of excessive pressure.

The forming device 10 further includes the lower die 11 and the upper die 12, which are paired with each other and include the pipe forming surfaces F5 and F6 for formation of the pipe portion 100a and the flange forming surfaces F1, F2, F3, and F4 for formation of the flange portions 100b and 100c. The hardness lowering portion 110 is composed of temperature control portions 120 and 121 which make the temperatures of the flange forming surfaces F1, F2, F3, and F4 at the time of formation higher than the temperatures of the pipe forming surfaces F5 and F6. Accordingly, the temperature control portions 120 and 121 make the temperatures of the flange forming surfaces F1, F2, F3, and F4 at the time of formation higher than the temperatures of the pipe forming surfaces F5 and F6 and thus a cooling time at the time of contact between the flange portions 100b and 100c and the flange forming surfaces F1, F2, F3, and F4 becomes long. Since the cooling time becomes long, there is a decrease in hardenability at the flange portions 100b and 100c and the hardnesses thereof becomes lower than that of the pipe portion 100a. Note that, in a case where the hardness lowering portion is configured by heating as in the present embodiment, it becomes easy to perform temperature control in comparison with an embodiment where cooling is performed as in FIG. 8. In the present embodiment, it becomes possible to set any optimum temperature for a structure and thus it becomes easy to avoid restrictions on a shape or the like.

In the forming device 10, the temperature control portions 120 and 121 may be intermittently formed at the flange forming surfaces F1, F2, F3, and F4 along the longitudinal direction of the flange forming surfaces F1, F2, F3, and F4. Accordingly, it is possible to ensure a high strength by lowering the hardness of a portion of the flange portions 100b and 100c in the longitudinal direction at which welding is performed, without lowering the hardness of the other portion thereof.

A forming method according to the present embodiment is a forming method of expanding the metal pipe material 14 to form the metal pipe 100 having the pipe portion 100a and the flange portions 100b and 100c, the forming method includes lowering the hardnesses of the flange portions 100b and 100c to be lower than the hardness of the pipe portion 100a.

According to the forming method in the present embodiment, it is possible to obtain operations and effects similar to those of the above-described forming device 10.

The metal pipe 100 according to the present embodiment is the metal pipe 100 including the pipe portion 100a and the flange portions 100b and 100c and the hardnesses of the flange portions 100b and 100c are lower than the hardness of the pipe portion 100a.

According to the metal pipe 100 in the present embodiment, it is possible to achieve a state where it is easy to perform welding with the flange portions 100b and 100c being pressed, while ensuring the strength of the pipe portion 100a which is required to have a high strength. Accordingly, it is possible to easily perform welding in a case where welding is to be performed with the flange portions 100b and 100c being pressed against another member.

In the metal pipe 100, the high-hardness portions 107 and the low-hardness portions 106, which are different from each other in hardness, are formed at the flange portions 100b and 100c and the hardnesses of the low-hardness portions 106 are lower than the hardnesses of the high-hardness portions 107. Accordingly, it is possible to facilitate welding by forming a portion at which welding is performed as the low-hardness portion 106 and to ensure a strength by forming the other portion as the high-hardness portion 107.

In the metal pipe 100, the low-hardness portions 106 are intermittently formed at the flange portions 100b and 100c along the longitudinal direction of the flange portions 100b and 100c. Accordingly, it is possible to ensure a high strength by forming a portion of the flange portions 100b and 100c in the longitudinal direction at which welding is performed as the low-hardness portion 106 and forming the other portion thereof as the high-hardness portion 107.

The present invention is not limited to the above-described embodiment. For example, the entire configuration of the forming device is not limited to that shown in FIG. 1 and can be appropriately changed without departing from the spirit of the invention.

Figure 8:
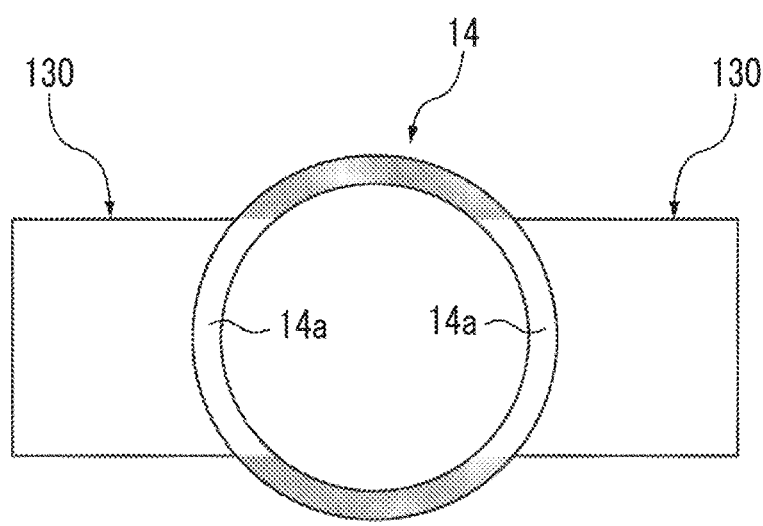
FIG. 8 is a view showing a configuration of a hardness lowering portion according to a modification example.

In addition, as the hardness lowering portion, a configuration as shown in FIG. 8 may also be adopted. In a forming device shown in FIG. 8, a hardness lowering portion may be composed of a cooling portion 130 which cools a portion 14a of the metal pipe material 14 in a state of being heated before the start of formation, the portion 14a be coming the flange portions 100b and 100c. Note that, in FIG. 8, a portion of which the temperature is high is given a gray scale and a portion that is cooled and of which the temperature is low is given no gray scale. The cooling portion 130 is formed of a heat absorbing material such as copper or aluminum. The cooling portion 130 can absorb heat from the portion 14a when coming into contact with the portion 14a of the metal pipe material 14 of which the temperature is high. Accordingly, the portion 14a that becomes the flange portions 100b and 100c is cooled in advance before formation is started and thus the maximum reachable temperature at the portion 14a is made low. Therefore, there is a decrease in hardenability of the flange portions 100b and 100c and thus it is possible to lower the hardness thereof.

In the forming device, the cooling portion 130 performs cooling by bringing a solid body into contact with the portion 14a of the metal pipe material 14 that becomes the flange portions 100b and 100c. Accordingly, the solid body absorbs heat from the portion 14a that becomes the flange portions 100b and 100c and thus it is possible to cool the portion 14a.

It should be understood that the invention is not limited to the above-described embodiment, but may be modified into various forms on the basis of the spirit of the invention. Additionally, the modifications are included in the scope of the invention.

What is claimed is:

1. A forming device that expands a metal pipe material to form a metal pipe having a pipe portion and a flange portion, the forming device comprising:
   a gas supply unit configured to supply a gas into the metal pipe;
   a first die and a second die that are paired with each other, wherein each of the first die and the second die comprises:
   a pipe forming surface configured to form the pipe portion,
   a flange forming surface configured to form the flange portion, and
   a hardness lowering portion configured to lower a hardness of the flange portion to be lower than a hardness of the pipe portion, and
   wherein the hardness lowering portion comprises:
   a temperature control portion configured to make a temperature of the flange forming surface at a time of formation higher than a temperature of the pipe forming surface.

2. The forming device according to claim 1,
   wherein the temperature control is configured to bring the flange forming surface to a temperature of about 500 to 1000° C. at the time of formation.

3. The forming device according to claim 1,
   wherein the temperature control portion is formed on a region outward of a base end side edge portion of the flange forming surface in a width direction.

4. The forming device according to claim 1,
   wherein the temperature control portion is not formed on a region of the flange forming surface to form an edge portion near a tip of the flange portion.

5. The forming device according to claim 1,
   wherein each temperature control portion comprises a member that is embedded in the flange forming surface, and
   wherein the member is formed of a material different from a material of the first die and the second die.

6. The forming device according to claim 5,
   wherein an electric resistance of the member is higher than that of the material of the first die and the second die.

7. The forming device according to claim 5,
   wherein a cooling rate of the member is lower than that of the material of the first die and the second die.

8. The forming device according to claim 1,
   wherein the temperature control portion is located at intermittent positions at the flange forming surface along a longitudinal direction of the flange forming surface.

* * * * *